United States Patent [19]

Sawan et al.

[11] Patent Number: 5,798,438
[45] Date of Patent: Aug. 25, 1998

[54] POLYMERS WITH INCREASED ORDER

[75] Inventors: Samuel P. Sawan, Tyngsborough, Mass.; Abdelhafid Talhi, Rochester, Mich.; Craig M. Taylor, Jemez Springs, N. Mex.

[73] Assignees: University of Massachusetts, Boston, Mass.; The Regents of the University of California, Oakland, Calif.

[21] Appl. No.: 709,775

[22] Filed: Sep. 9, 1996

[51] Int. Cl.$^6$ ................................. C08J 9/08; C08J 9/10
[52] U.S. Cl. .................... 528/483; 528/490; 528/491; 264/85; 264/108; 264/331.19
[58] Field of Search ............................ 528/483, 490, 528/491; 264/85, 108, 331.19

[56] References Cited

FOREIGN PATENT DOCUMENTS

| | | |
|---|---|---|
| WO 93/00389 | 1/1993 | WIPO . |
| WO 93/15255 | 8/1993 | WIPO . |
| WO 93/20400 | 10/1993 | WIPO . |

OTHER PUBLICATIONS

Sawan et al., "Evaluation of the Interactions Between Supercritical Carbon Dioxide and Polymeric Materials" Los Almos National Laborarory, University of Mass., Lowell, LA-UR-94-2341, pp. 1-40, 1994.

Shieh et al., "Interaction of Supercritical Carbon Dioxide with Polymers. I. Crystalline Polymers" J. of Applied Polymer Science, 59, pp. 695-705, 1996.

Horrocks et al., "Developments in Heat and Flame Resistant Textiles for Protective Clothing and Barrier Fabrics" VTT Symp. 133: 261-269, 1992.

Martinez et al., "Friction and Wear Behaviour of Kevlar Fabrics" J. of Materials Science, pp. 1305-1311, 1993.

C. L. Segal, "High-Performance Organic Fibers, Fabrics, and Composites for Soft and Hard Armor Applications" 23rd International SAMPE Technical Conference, Oct. 21-24, 1991.

Shieh et al., "Interaction of Supercritical Carbon Dioxide with Polymers. II. Amorphous Polymers" J. of Applied Polymer Science 59:707-717, 1996.

*Primary Examiner*—David W. Wu
*Attorney, Agent, or Firm*—Fish & Richardson P.C.

[57] ABSTRACT

The invention features polymers with increased order, and methods of making them featuring a dense gas.

25 Claims, 1 Drawing Sheet

POLYMERS WITH INCREASED ORDER

STATEMENT AS TO FEDERALLY SPONSORED RESEARCH

The subject matter of this application was funded in part from Federal grant 5035L0014-3C. The U.S. government may have certain rights in this invention.

BACKGROUND OF THE INVENTION

This invention relates to polymers with increased order.

Polymeric fibers, fabrics, and composites of intermediate and high strength are used to manufacture light weight containers, tents, vehicle covers, and structural members in automotive and aerospace construction. In particular, light weight, high tensile strength polymers are useful in the preparation of high performance composites and ballistic protection. Existing high strength fibers include the polyamide Kevlar® (Du Pont) and the ultrahigh molecular weight (UHMW) polyethylene Spectra™ 100 (Allied Signal Corporation).

SUMMARY OF THE INVENTION

The invention is based on the discovery that the order of a polymeric material can be significantly, and permanently increased by applying force to the polymeric material in the presence of a gas under elevated pressures and temperatures. The gas is chemically inert with respect to the polymeric material. The increased order improves performance characteristics such as increased tensile strength.

In general, the invention features a method of permanently increasing the order of a polymeric material, and the resulting highly ordered materials. This method includes (a) exposing the polymeric material to a dense gas system at a specific temperature and pressure; (b) applying an orienting force to the polymeric material; and thereafter (c) substantially removing the dense gas system from the polymeric material. In general, step (a) and step (b) are performed during overlapping time intervals.

The dense gas system can include, e.g., sulfur hexafluoride ($SF_6$), diethyl ether, or a freon selected from CFC-113 ($C_2Cl_3F_3$), HCFC-141b ($C_2H_3Cl_2F$), and HCFC-123 ($C_2HCl_2F_3$), and preferably includes at least one of carbon dioxide, nitrogen, nitrous oxide, and $C_{1-5}$ alkanes (e.g., methane, ethylene, ethane, propane, propylene, butanes, and n-pentane). The dense gas system can include a supercritical fluid (e.g., supercritical carbon dioxide) or a subcritical fluid. The dense gas system can also include a polymer-plasticizing or polymer-solvating additive such as hexane, an aromatic solvent such as toluene, or a liquid halocarbon (e.g., $C_{1-3}$ fluorocarbon, chlorocarbon, or fluorochlorocarbon).

In some embodiments, the polymeric material includes a polymer selected from nylons (e.g., Nylon-6, Nylon-6,6, Nylon-7, and Nylon-9), polyesters (e.g., polyethylene terephthalate), and polyolefins having $C_{2-10}$ monomer units, such as $C_{2-8}$ or $C_{2-5}$ monomer units, e.g., polyethylene, polypropylene, and polybutylene.

In one embodiment of the method, the polymeric material is a nylon polymer, the dense gas system is substantially carbon dioxide or nitrogen, and step (a) includes exposing said nylon polymer to the dense gas system at a pressure between 2,000 and 5,000 psig at a temperature between 60° C. and 110° C. for a period between 1 minute and 3 hours, such as between 10 minutes and 3 hours, or between 50 minutes and 3 hours. In another embodiment, step (a) includes exposing the polymeric material to carbon dioxide at about 3,000 psig and at about 70° C. Step (b) includes applying an orienting force of between 200 and 600 grams, wherein step (b) occurs before step (a). Step (c) includes decreasing the temperature of the dense gas system (e.g., to atmospheric pressure) over a period between 1 second and 3 hours, such as between 3 seconds and 3 hours, between 10 seconds and 2 hours, or between 30 minutes and 3 hours). A specific example is decreasing the pressure of the carbon dioxide from 3,000 psig to atmospheric pressure over a time interval between 1 minute and one hour, e.g., between 5 minutes and 40 minutes, or between 15 minutes and 1 hour.

In another aspect, the exposing step (a) includes exposing the polymeric material to a first dense gas system, and thereafter, further exposing the polymeric material to a second dense gas system. The second dense gas system can be at a different pressure than the first dense gas system, and the second dense gas system can have a different chemical composition than the first dense gas system, e.g., different proportions of the same one, two, or three or more gases, different additives, or different gases altogether. The polymeric material can be exposed to the second dense gas system after the orienting step. The method can also include, after the step of decreasing the pressure of the first dense gas system, the step of decreasing the pressure of the second dense gas system.

The invention also features a high tensile-strength polymer made according to the methods of the invention. For example, the invention provides a nylon polymer having a tenacity of at least 8.5 to 8.7 grams per decitex (gpdtex), e.g., between 8.6 and 9.5 or 10.5 gpdtex, wherein a decitex is the weight in grams of 10,000 meters of a fiber or yarn.

As used herein the term "increasing order" includes aligning the polymer chains, decreasing the proportion of coiled chains, microamorphous domains, or amorphous domains, increasing crystallinity, and decreasing defects. Defects include stress points, micromorphous domains, voids, and structural irregularities. Increased order can be measured directly by standard techniques such as solid state $^{13}$C-NMR, differential scanning calorimetry (DSC), thermogravimetric analysis (TGA), and X-ray diffraction. Increased order is indicated by changes in properties such as tensile strength, density, heat resistance, crystallinity, stiffness, stress/strain profiles, and yield characteristics.

As used herein, a "dense gas system" is a system of one or more gases at a pressure greater than atmospheric pressure (0 pounds per square inch gauge (psig), or 14 pounds per square inch (psi)), e.g., greater than 100 psig or 150 psig, and at a temperature greater than room temperature, e.g., greater than 25° C. A dense gas may be at a subcritical, critical, or supercritical pressure and temperature. At a supercritical pressure and a super-critical temperature, the substance cannot exist in two phases (gas and liquid). A dense gas is chemically inert with respect to the polymeric material, and may contain additives.

A "polymeric material" is a material including one or more-polymers, copolymers, or block copolymers. The untreated order of the polymeric material may range from amorphous to highly ordered or crystalline. A polymeric material may contain regions of different polymers, and regions of different degrees of order.

An "orienting force" is a force having a magnitude and a direction. Orienting forces include, for example, a force that varies in magnitude over time, a force that has a fixed weight or load over time, and a force provided to a polymeric material with a fixed geometry (fixed length or volume) over time.

The disclosed process provides high-performance polymeric materials which are generally less bulky, less heavy, and less expensive to produce than existing materials using existing methods. Thus, even if the actual strength of the treated polymeric material is not significantly greater than that of known materials, the method to produce the treated polymeric material typically provides significant cost savings compared to known manufacturing methods. Use of a dense gas provides efficient recovery, purification, and reuse of the gas "solvent," in contrast to the expense of recovery and disposal of environmentally undesirable solvents such as toluene or chlorinated fluorocarbons. A dense gas such as nitrogen or carbon dioxide has low human toxicity, is not readily combustible, occurs naturally, and is readily available.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION OF THE INVENTION

Figure 1:
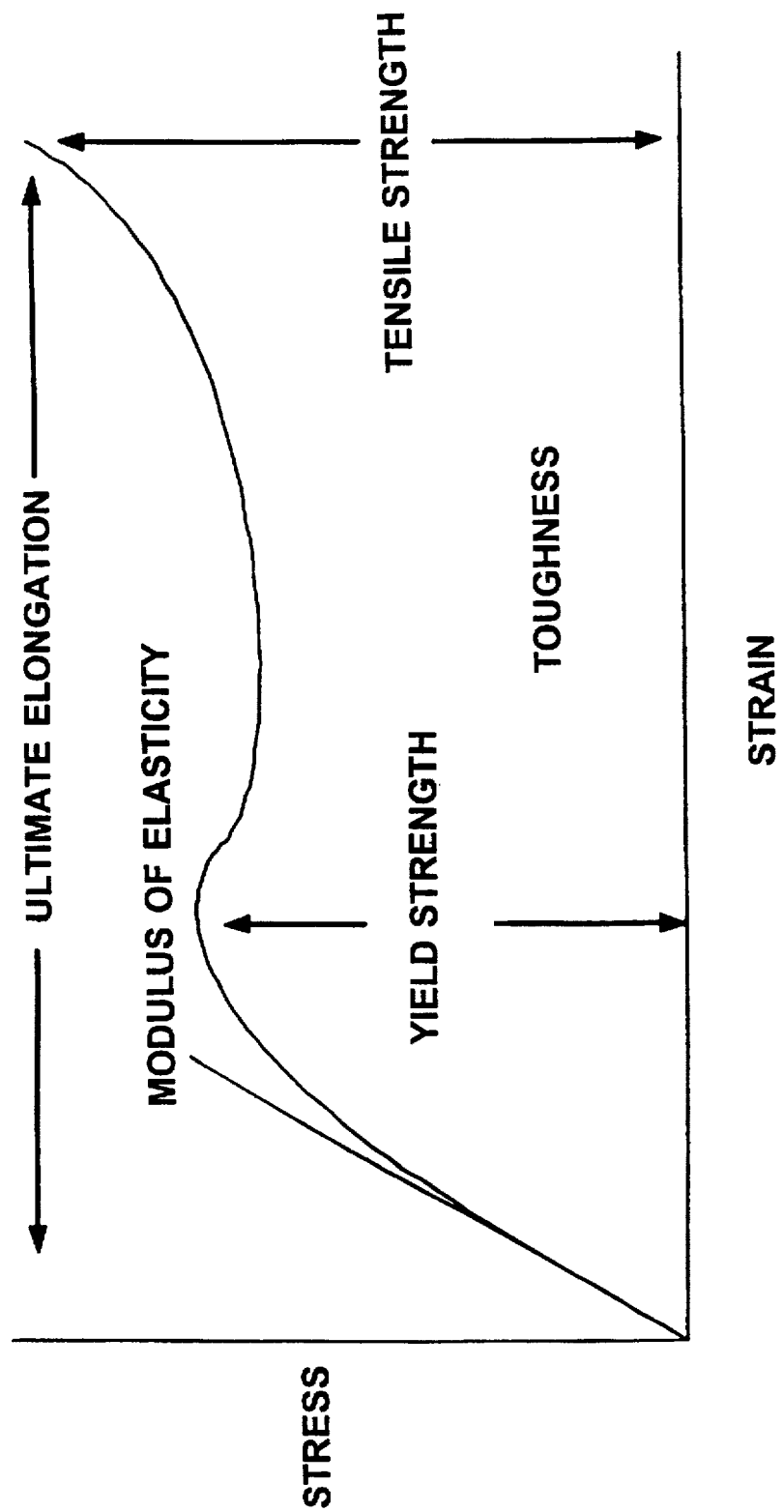
FIG. 1 is a stress-strain plot of a plastic.

The invention is based on the discovery that the order of a polymeric material can be significantly increased by the combination of (i) applying a force to the polymeric material (ii) in a dense gas system, i.e., at an elevated temperature and pressure. Under elevated pressure, a low molecular weight gas diffuses into the polymer lattice of the polymeric material. The dense gas system diffuses preferentially into the amorphous regions of a polymeric material, i.e., regions of relatively low order, and solvates and plasticizes the polymer lattice. Applying an orienting force to this plasticized polymer lattice increases the order.

After order has been increased, the release of pressure as a function of time regulates the diffusion of the gas out of the polymer lattice. The outward diffusion can further increase the order of the polymeric material, further plasticize the amorphous regions, increase crystallinity, or a combination thereof. Increased order improves properties such as tensile strength, density, and crystallinity.

The methods of the invention result in a permanent increase in order of the polymeric materials, that is, unless they are subsequently retreated by the methods of the invention, or are otherwise exposed to conditions that plasticize or solvate the material.

Dense Gas Systems

A dense gas system includes one or more gases, wherein each type of gas is a co-gas in the system. The proportions of the constituent gases are varied to provide the desired degree of solvation, plasticization, or both for a given polymeric material at the desired range of temperature and pressure. The temperature, pressure, and presence of one or more co-gases, such as $N_2$ in $CO_2$, determine the solvent properties of a dense gas system. When a polymeric material is exposed to a dense gas, the temperature is preferably elevated, i.e., greater than room temperature. Examples include temperatures greater than 35° C., 40° C., 80° C., or 120° C., or temperatures between 40° C. and 200° C. For a given inert gas, the treatment temperature may be a subcritical, critical, or supercritical temperature. A supercritical fluid has gaseous properties such as low viscosity, high rate of flow, and high rate of diffusion, and nearly zero surface tension, as well as some liquid-like properties, such as higher density, and varied solvent power.

A preferred dense gas system is chemically inert with respect to the polymeric material being exposed and is of low molecular weight, e.g., has a molecular weight between 28 and 188 atomic mass units (amu). A low molecular weight gas facilitates the diffusion of the gas into the polymer. The gas can move into and out of the polymer lattice quickly. A dense gas generally plasticizes or solvates (or both) the polymeric material being exposed. Evidence of plasticization includes a decrease in the glass transition temperature of any polymer. Suitable gases include $CO_2$, $N_2$, nitrous oxide (NO), $C_{1-5}$ alkanes (including methane, propane, butanes, and pentanes), and halocarbons. Halocarbons include freons, fluorocarbons, and chlorocarbons such as fluoroform, monofluoromethane, dichloromethane, chloroform, chlorotrifluoromethane, and chlorodifluoromethane, CFC-113 ($C_2Cl_3F_3$), HCFC-141b ($C_2H_3Cl_2F$), and HCFC-123 ($C_2HCl_2F_3$). $SF_6$ is also suitable as a dense gas.

Polymeric Materials

Untreated polymeric materials for use in the invention can have regions of relatively high order and relatively low order. The disclosed methods operate on the regions of relatively low order. When materials with higher tensile strength are desired, substantially ordered polymers such as polyamides (e.g., nylons, including Nylon 6,6), polyesters (e.g., poly(ethylene) terephthalate), and polyolefins (e.g., polyethylene, polypropylene, and polybutane), or copolymers thereof, or mixtures containing them, are preferred starting materials.

A polymeric material can be substantially made of a specific polymer such as Nylon-6, Nylon-7, Nylon-8, Nylon-9, Nylon-10, Nylon-11, Nylon-12, Nylon-6,9, Nylon-6,10, Nylon-6,12, Nylon-66/10, Nylon-66/610/6, poly-m-xylylene adipamide (Mitsubishi Gas Chemical Co., MXD6), poly(m-phenyleneisophthalamide) (Du Pont, HT-19 or Nomex), poly-(p-phenyleneterephthalamide) (Du Pont, Kevlar), aromatic polyamide (Monsanto, PABH-TX-500), polyguinazolidione (Bayer AFT-200), Quiana, and polyethylene terephthalate, or copolymers thereof.

Particularly suitable gas/polymer pairs include $CO_2$ and nylons, $CO_2$ and polyethylene terephthalate, $C_{1-2}$ alkanes and polyethylene, and freons and chlorinated or fluorinated polymers.

A polymeric material can be in any state of manufacture, and can be a fiber, a moldable or molded form, an extrudable or extruded form (e.g., a tube or sheet), and can be a manufactured product, such as a yarn, fabric, or non-woven material or matrix. A polymeric material can be substantially an entire article, such as a vest, container, pipe, or tubing. Alternatively, a polymeric material can form a part of an article that also includes nonpolymeric materials, such as metal, glass, or ceramic.

Thus, a polymeric material can be treated according to the invention before, during, or after, e.g., immediately after, it is formed into a fiber, tube, sheet, or a larger manufactured article, e.g., by molding or extrusion.

Orienting Force

An orienting force can be generated by a constant weight or load, constant strains and constant geometry, e.g., constant length or volume. A preferred orienting force is anisotropic, such as axial or radial stress applied by tension. Where the polymeric material is a fiber, fixed loads can range, for example, from 2 g to 800 g, e.g., 20 g to 400 g, 200 g to 600 g, or 200 g to 800 g. These loads can be higher in commercial applications based on the principle that the load should be between 10% and 90% of the yield, break, or burst strength of the polymeric material under the treatment conditions, and are preferably between 30% and 80%, 40% and 60%, 20% to 50%, or 40% to 70% of the yield, break, or burst strength, depending on the specific material and conditions used. These strength values of a given polymeric material can be easily determined under the treatment conditions using standard techniques and equipment. In some embodiments, minimal stress or strain is desirable, e.g., to achieve a specific percentage of increase in order.

As the polymeric material becomes plasticized and more crystalline, the constant load may exert different amounts of strain. Thus, an orienting force can be applied so that it varies in the weight or load, so as to provide a constant strain on the changing polymeric material.

An orienting force also can be applied to a polymeric material with a fixed geometry (e.g., fixed length for a fiber, or fixed volume for a sheet or molded article). When a dense gas system diffuses into the polymeric material, a force is exerted on the spatially confined material.

Treatment Methods

In general, the disclosed method includes the following three steps: (a) exposing the polymeric material to a dense gas system, (b) applying an orienting force to the polymeric material, and thereafter (c) substantially removing the dense gas system from the polymeric material, e.g., decreasing the pressure of the dense gas.

For example, a polymeric fiber can be loaded with a weight, and hung in the reaction vessel of a supercritical fluid apparatus (CF Technologies, Inc., Hyde Park, Mass.). An attached weight provides an anisotropic orienting force to the fiber. After closing the system, the vessel exit valve is closed and the inlet valve is opened. The temperature is raised and the vessel is flooded with the selected gas at an elevated pressure, thereby exposing the polymeric fiber to a dense gas. After a period of time, the pressure is reduced, e.g., by opening the exit valve.

In the above example, application of the orienting force (step (b)) occurs before and continues throughout the exposure of the polymeric fiber to the dense gas system (step (a)). In other words, step (b) overlaps in time with step (a), and the time interval for step (b) is greater than the time interval for step (a). However, the step of applying an orienting force can occur before, during, or after the step of exposing the polymeric material to a dense gas system, provided there is some period during which the orienting force acts on the polymeric material while the gas remains within the polymer. Preferably, the pressure is an effective solvating or plasticizing pressure.

The invention encompasses several variations for steps (a) and (b), some of which are enumerated below. First, hang the fiber-with-load assembly in the vessel, fill the vessel with a gas system at about atmospheric temperature and pressure, then raise the temperature and pressure to sub- or supercritical values. Second, hang the fiber-with-load assembly in the vessel at conditions of about atmospheric temperature and pressure, then raise the temperature, and then add the dense gas system, e.g., a supercritical fluid, to the vessel, thereby raising the pressure to a desired value. Third, hang the fiber without a load in the vessel, expose the fiber to a dense gas system (by either filling the vessel with a gas system at about atmospheric temperature and pressure, followed by elevating the temperature and pressure or by filling the vessel with a dense gas already at the desired sub- or supercritical pressure and temperature), and then apply an orienting force to the fiber.

Other embodiments include treatment methods where the temperature and pressure of the dense gas are subcritical, and where polymeric forms, such as moldable, extrudable, or otherwise manufactured products are treated. In some embodiments, step (a) and step (b) are performed during substantially coextensive time intervals. In other embodiment, the time interval of step (a) is shorter than the time interval of step (b).

Turning to step (c), after treatment with a dense gas at a sub- or supercritical pressure, the vessel is depressurized. Depressurization can be achieved by steps (relatively sudden drops in pressure with periods of relatively even pressure), by a slow steady decrease, by a series of variable-rate decreases, or by a series of fluctuations (decreases and increases in pressure, with corresponding changes in temperature). Preferably, the depressurization occurs uniformly, e.g., 50 psig/min for a starting pressure of 3,000 psig.

The appropriate time interval within which to apply an orienting force is more independent than the time interval within which to expose a material to a dense gas or within which to remove the dense gas. The controlling factor is that the orienting force must be applied at some time when the polymeric material is plasticized and/or solvated, to at least a certain degree, by the dense gas. A sheet or molded polymeric form that is much thicker than a fiber generally needs longer treatment and depressurization time.

Examples of treatment and depressurization programs for nylon and polyester fibers include the following sets of treatment pressure, treatment temperature, treatment time, magnitude of orienting force, and depressurization time:

a) 3,000 psig, 70° C., 1 hour, 200 g, 1 hour;

b) 3,000 psig, 70° C., 2 hours, 400 g, 5 hours;

c) 1,000 psig, 100° C., 1 hour, 400 g, 1 hour;

d) 2,000 psig, 40° C., 1 hour, 600 g, 30 minutes;

e) 4,000 psig, 100° C., 2 hours, 500 g, and 1 hour.

In general, shorter treatment times and depressurization times are preferred (e.g., between 1 minute and 1 hour, 30 minutes, 20 minutes, 10 minutes, 5 minutes, or 3 minutes). Depressurization times can be shorter than a minute, e.g., 1 second, 3 seconds, 5 seconds, 10 seconds, or 30 seconds.

Non-fibers are treated in a similar manner, taking into consideration the thickness of the material, and the diffusive properties of the selected gas or gas system. Pressures of between 500 psi and 10,000 psi, and orienting forces of between, e.g., 40% and 60% of the breaking load of the polymeric material under the treatment conditions, can be used.

In the examples above, for simplicity, the orienting force is applied for about at least as long as the sum of the treatment time and the depressurization time. However, in other embodiments the orienting force can be applied for substantially longer treatment times, or substantially as long as the depressurization time, or for a period overlapping in time with the treatment and depressurization and yet shorter than the sum.

Depressurization includes decreasing the treatment pressure, decreasing the density of the dense gas, and exposing the polymeric material ultimately to atmospheric pressure and ambient temperature. Depressurization frequently causes a decrease in temperature. In one embodiment, heat is added to the system to keep the temperature surrounding the polymeric material substantially constant (plus or minus about 10° C. of a selected temperature) as the pressure is reduced by bleeding away the dense gas. In another embodiment, the temperature is decreased during pressure release, or after pressure release.

In another aspect, subjecting a polymeric material to two or more cycles of treatment will further enhance plasticization of amorphous regions, and orderedness. For example, variations of the method include repeating the exposing step (a), the applying step (b), and the reducing step (c) in a plurality of cycles. For example, a polymeric material is treated first at temperature $T_1$, at a pressure $P_1$, for time $t_1$, after which the system is allowed to return to ambient conditions which include reducing pressure of the dense gas. Then the material is treated a second time at $T_1$ and $P_1$ for time $t_1$. Alternatively, the material is treated a second time at $T_2$, $P_2$, for time $t_2$, where the conditions $T_2$, $P_2$, and $t_2$ are different from $T_1$, $P_1$, and $t_1$.

This can be generalized into a variety of sequential treatments: $[T_i, P_i, t_i]_n$, wherein i is an integer from 1 to n, and n is an integer such as 2, 3, 5, 10, or more. Each value in a given set of conditions $T_i$, $P_i$, and $t_i$ is independently the same or different as any other $T_i$, $P_i$, and $t_i$, respectively. The conditions of step (c), depressurization rate(s) and time(s), can vary or be substantially the same where multiple treatments are contemplated. The polymeric material is generally returned to ambient T and P after each exposure. Similarly, the treatment conditions include specific values for the magnitude and direction of the orienting force and the interval during which the orienting force is applied. In general, the interval during which the orienting force is applied overlaps with the interval during which the increased pressure is applied, but need not be co-extensive.

The treatment variables include the pressure of the dense gas, the temperature, the dense gas treatment time, the applied orienting force, the applied orienting force treatment time, and the depressurization rate and time. For example, step (b) includes applying an orienting force between 60% and 90% of the yield, break, or burst strength of the material at the process point, i.e., under the treatment conditions of temperature, pressure, humidity, and dense gas conditions. Burst strength is the measure of the ability of a material to withstand pressure without rupture, e.g., the pressure required to cause a vessel (e.g., a bottle) with a given wall thickness to rupture.

In general, a greater orienting force provides more orientation. For some applications, however, an orienting force that is between 30% and 60%, or between 50% and 75% of the yield, break, or burst strength, can produce the optimal order, or at least a commercially significant increase in order, which, in turn, affects characteristics such as strength. Whatever the form of the polymeric material, the yield, break, or burst strength of the material can be easily determined using standard techniques and equipment.

Examples of commercial scale production include treating long polymeric fibers or yarns on take-up spools in a chamber, treating a large scale batch, or treating completed fabrics or textiles or bulk material (e.g., a monster bobbin). Fibers can be produced at a spinning rate as high as 120 miles of fiber per hour. A brief treatment process according to the invention can be inserted between the high-velocity spinning process and the collection of the fiber on a take-up spool. Another embodiment includes spinning a fiber, treating the fiber according to the invention, and then coating the treated fiber with a coating material. This coated product can be further treated according to the invention.

Treated Polymeric Materials

The invention also features high tensile-strength polymers (or polymeric materials made thereof) made according to the methods of the invention. These methods provide a relatively inexpensive way to improve the tensile strength and other properties of polymeric materials. A polymeric material treated according to the invention can be distinguished from a material made of the same polymer by another, typically more expensive, manufacturing process, even if they are of comparable strength. In particular, the treated polymeric material of the invention can be distinguished from untreated materials using standard analytical techniques such as NMR and measurements of crystallinity, to demonstrate that the two are physically different compositions.

In some embodiments, comparison of the NMR spectra may show different numbers of peaks; in other embodiments, comparison of the percent crystallinity may show significant differences. For example, the percent crystallinity of the treated polymeric material can be higher than the crystallinity of the known material (e.g., 2%, 3%, 4%, or more, higher than the known material).

According to the disclosed methods, an applied stress or orienting force further increases the crystallinity, and increases anisotropy. The increase in order can be measured, for example, by an increase in tensile strength of 5%, 10%, 15%, or 20%, or more, relative to the polymeric material before treatment. Tensile strength is the strength of a sample subjected to tension, as opposed to torsion, shear, or compression. Tensile strength is measured in force per unit cross-sectional area of the unstrained specimen, e.g., pounds force per square inch (1 bf/in$^2$).

In some embodiments, one result of the disclosed treatment is the increase of tenacity (relative to untreated material) of at least 5%, 8%, 10%, 15%, or 20%, or between 5% and 15%. Tenacity is measured in force per unit density, such as grams force per decitex, wherein a decitex is the weight in grams of 10,000 meters of a fiber or yarn (grams per decitex, or gpdtex). Examples of improved nylon polymers include those resulting in a nylon polymer having a tenacity of at least 7.7 gpdtex, or at least 8.2 gpdtex. In some embodiments, the nylon polymer has a tenacity between 8.6 and 11 gpdtex, or between 8.6 and 10.5 gpdtex.

Mechanical properties were measured using standard test sample configurations, such as the dumbbell configuration used in the ASTM D638 tensile test method, in an Instron Model 6025 (Instron, Canton, Mass.). A stress-strain curve as shown in FIG. 1 of a plastic sample provides five descriptive parameters. "Tensile strength" is the maximum stress the material withstands to the point of rupture. For example, a strong plastic has a high tensile strength. "Yield strength" is the stress at which nonelastic deformation begins. A brittle plastic generates a stress-strain plot that terminates before reaching the yield point. "Ultimate elongation" is the total amount of extension that the sample undergoes, as a percentage of the original length. The "modulus of elasticity" is the stress-strain ratio (or slope of the curve) in the elastic region wherein Hooke's law applies. For example, a hard plastic has a high modulus of elasticity (steep stress-strain curve). "Toughness" is the energy required to break the material per unit volume, measured by the integrated area under the stress-strain curve. X-ray diffraction or neutron-diffraction can measure the amount of amorphousness or crystallinity and the domain size of crystallites. In general, specific gravity and infra-red birefringence orientation each increase with increased crystallinity.

In addition, some polymeric materials treated according to the invention are breathable materials, have hydrophilic surfaces, or absorb water. Some treated materials are also flame retardant, as determined, for example, by a vertical strip test such as Federal Test Method 5903.2 in the US and DIN 66083 5-b in Germany. Other treated materials provide thermal protection, as measured by heat transfer from convective or radiant heat by recording the time taken for the temperature to rise by 25° C. at the back of a fabric when the front is exposed to a flame source. Some treated materials are heat and flame resistant in the presence of an igniting source. Materials and articles of the invention can be further processed and strengthened by methods known in the art, such as the fluorinated coatings which contain polar nitrogen groups described in WO 93/15255, and multiple layers of polymeric fabric embedded in a resin matrix described in WO 93/00389.

Uses

The disclosed methods improve the performance characteristics of polymeric materials. For example, the disclosed methods provide higher-performance materials such as fibers, fabrics, composites, and molded or extruded forms. These materials can be used to manufacture light weight and optionally breathable ballistic protection in the form of clothing, vehicles, and permanent structures (e.g., raincoats, bullet-proof vests, boot soles, helmets, camouflage, tents, and other troop or electronic shelters).

These materials also can be used in automotive and aerospace construction. Examples include structural members of helicopters, gas turbine engine containment rings, aircraft seats, and various containers.

The treated polymeric materials can also be used in the manufacture of barrier textiles such as transport upholstery barriers, and contract or domestic barriers such as construction barriers, child gates, pool covers, and vehicle covers.

The following examples are considered illustrative of the principles described above, not limitative.

EXAMPLES

Example 1

Samples of nylon-6,6 yarn (940 dtex, F-140 type 1352, DuPont, Doncaster, Yorkshire, England) were cut and attached to different loads. Each yarn-load assembly was hung individually in the 5 liter reaction chamber of the supercritical fluid apparatus. Carbon dioxide was added to the extractor vessel which was brought to the indicated temperature and a pressure of 3,000 psig (see Table 1). After a 1-hour treatment time, the vessel pressure was gradually reduced to atmospheric pressure over 1 hour. The treated samples were left for 48 hours in sealed plastic bags before their mechanical properties were measured with a Chatillon™ TCD500 testing machine (Chatillon, Greensboro, N.C.).

Tensile properties of the fibers were determined according to ASTM D 2256-95a test method option A (tensile properties of yarns by the single-strand method). The results shown in Table 1 below demonstrate that the tenacity of treated fibers was increased up to 23% compared to the untreated fibers. Thus, polymeric materials subjected to the disclosed treatment have a tenacity of at least 105%, and preferably at least 110%, 115% or 120% of the untreated or otherwise commercially available polymeric material.

TABLE 1

TENSILE PROPERTIES OF TREATED NYLON - 6,6

| Sample No. | Treatment temperature (°C.) | Load on sample (g) | Percent increase in tenacity |
|---|---|---|---|
| 1 | 40 | 20 | 15.9 |
| 3 | 40 | 100 | 15.9 |
| 6 | 100 | 100 | 15.9 |
| 8 | 100 | 50 | 15.9 |
| 45 | 70 | 200 | 23.2 |
| control | — | — | |

Example 2

A poly(ethylene terephthalate) bottle is treated in the same manner as nylon-6,6 in Example 1 above, except for the following substitutions. Carbon dioxide is replaced with nitrogen, and the supercritical fluid apparatus and extractor vessel are adapted to produce and withstand a pressure of 5,000 psig. The anisotropic force is provided by creating a pressure differential between the inside and the outside of the bottle, or by providing a spherical spring inside the bottle. The tenacity and crystallinity of the treated bottle are measured.

Example 3

An orienting force is applied to a plasticized polymer immediately after the polymer has been removed from a dense gas, but while a significant amount of the gas remains in the polymeric material prior to slowly diffusing out. A spool of a fiber such as nylon-6,6 or PET is treated in carbon dioxide at a pressure of 5000 psig and temperature of 60° C. for 30 minutes. The fiber is drawn through a die on the pressure chamber. The die is designed so that the pressure within the chamber is maintained. An orienting force is applied to the fiber to draw it out through the die. The polymeric fiber is drawn from the chamber at a force of about 70 to 90% of the breaking force of the plasticized polymer. The polymeric fiber is subsequently wound on a take-up spool with a constant load applied to the fiber during the take-up process to maintain a constant orienting force on the fiber until all of the dense gas has diffused out of the fiber.

Other Embodiments

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

What is claimed is:

1. A method of increasing the order of a polymeric material, said method comprising:

(a) exposing said polymeric material to a dense gas system at a specific temperature greater than room temperature and at a pressure greater than atmospheric pressure;

(b) applying an orienting force to said polymeric material, wherein step (a) and step (b) are performed during overlapping time intervals; and thereafter (c) removing some or all of the dense gas system from the polymeric material, thereby increasing the order of said polymeric material.

2. A method of claim 1, wherein said polymeric material comprises a polymer selected from the group consisting of nylons, polyesters, and polyolefins.

3. A method of claim 2, wherein said polymer is selected from the group consisting of Nylon-6, Nylon-6,6, Nylon-7, Nylon-8, Nylon-9, Nylon-10, Nylon-11, Nylon-12, Nylon-6,9, Nylon-6,10, Nylon-6,12, Nylon-66/10, and Nylon-66/610/6, poly-m-xylylene adipamide, poly(m-phenyleneisophthalamide), poly-(p-phenyleneterephthalamide), aromatic polyamide, polyquinazolidione, Quiana, and polyethylene terephthalate.

4. A method of claim 3, wherein said polymer is selected from the group consisting of Nylon-6, Nylon-6,6, Nylon-7, Nylon-9, and polyethylene terephthalate.

5. A method of claim 1, wherein said dense gas system comprises one or more of carbon dioxide, methane, ethylene, ethane, nitrous oxide, propane, propylene, nitrogen, sulfur hexafluoride, diethyl ether, n-pentane, CFC-113 ($C_2Cl_3F_3$), HCFC 141b ($C_2H_3Cl_2F$), and HCFC-123 ($C_2HCl_2F_3$).

6. A method of claim 5, wherein said dense gas system comprises carbon dioxide, nitrogen, nitrous oxide, and $C_{1-5}$ alkanes.

7. A method of claim 1, wherein said dense gas system comprises a supercritical fluid.

8. A method of claim 1, wherein said dense gas system comprises supercritical carbon dioxide.

9. A method of claim 1, wherein said dense gas system comprises a subcritical fluid.

10. A method of claim 1, wherein said dense gas system comprises an additive selected from the group consisting of a $C_{1-6}$ alkane, an aromatic organic solvent, and a $C_{1-3}$ halocarbon.

11. A method of claim 1, wherein said polymeric material is a fiber, a molded form, an extruded form, or a manufactured polymeric product.

12. A method of claim 1, wherein said polymeric material is a fiber.

13. A method of claim 1, wherein the orienting force is anisotropic.

14. A method of claim 1, wherein step (a) and step (b) are performed during coextensive time intervals.

15. A method of claim 1, wherein the time interval of step (a) is shorter than the time interval of step (b).

16. A method of claim 1, wherein step (c) includes decreasing the temperature of the dense gas system.

17. A method of claim 1, wherein said polymeric material is a nylon polymer, said dense gas system comprises carbon dioxide or nitrogen, and step (a) includes exposing said nylon polymer to said dense gas system at a pressure between 2,000 and 5,000 psig at a temperature between 60° C. and 110° C. for a period between 5 minutes and 3 hours.

18. A method of claim 1, wherein step (c) includes decreasing the pressure of said dense gas system to atmospheric pressure over a period between 3 seconds and 3 hours.

19. A method of claim 1, wherein said polymeric material is a nylon polymer selected from the group consisting of Nylon-6, Nylon-6,6, Nylon-7, Nylon-9, and polyethylene terephthalate; step (a) includes exposing said polymeric material to carbon dioxide at about 3,000 psig at about 70° C.; step (b) includes applying an orienting force of between 200 and 800 grams; and step (c) includes decreasing the pressure of the carbon dioxide from 3,000 psig to atmospheric pressure over a time interval between 1 minute and 1 hour, wherein step (b) occurs before step (a).

20. A method of claim 1, wherein said exposing step (a) comprises exposing said polymeric material to a first dense gas system, and further exposing said polymeric material to a second dense gas system.

21. A method of claim 20, wherein said second dense gas system is at a different pressure than said first dense gas system.

22. A method of claim 20, wherein said second dense gas system comprises at least one different gas than said first dense gas system.

23. A method of claim 20, wherein said polymeric material is exposed to said second dense gas system after said orienting step.

24. A method of claim 20, wherein said polymeric material is exposed to said second dense gas system after said step of decreasing the pressure of said first dense gas system, further comprising a step of decreasing the pressure of said second dense gas system.

25. A method of claim 1, wherein the polymeric material comprises a polyolefin including $C_{2-5}$ monomer units.

* * * * *